Aug. 6, 1968     M. GERSTEN     3,395,589

MOTION CONVERTING APPARATUS

Filed June 6, 1966     2 Sheets-Sheet 1

INVENTOR.
MILTON GERSTEN

Aug. 6, 1968  M. GERSTEN  3,395,589

MOTION CONVERTING APPARATUS

Filed June 6, 1966  2 Sheets-Sheet 2

INVENTOR.
MILTON GERSTEN
BY

United States Patent Office 3,395,589
Patented Aug. 6, 1968

3,395,589
MOTION CONVERTING APPARATUS
Milton Gersten, Valley Stream, N.Y., assignor to Orbit Instrument Corporation, Syosset, N.Y., a corporation of New York
Filed June 6, 1966, Ser. No. 555,626
17 Claims. (Cl. 74—471)

ABSTRACT OF THE DISCLOSURE

An apparatus for converting a resultant input motion into component output motions in at least two different planes by the use of a sphere having universal movement and means engaging the sphere to convert its universal motion into the component output motions.

This invention relates generally to an apparatus for converting a resultant motion into component motions in at least two different planes and, more particularly, pertains to a device for converting the universal movement of a sphere into respective movements of output members located in mutually perpendicular planes.

In apparatuses for controlling motion it is common to provide a control handle which is adapted to be grasped by at least one hand. The movement of the hand controls the movement of output members in different planes. Thus, the "joy stick" of an aircraft controls the movement of the craft in the "X" or horizontal plane as well as in the "Y" or vertical plane. The resultant motion of the control "stick" is transmitted to the control surfaces of the aircraft to cause the craft to perform maneuvers in both the X and Y axes. Of course such controlled movements need not be limited to aircraft maneuvers, but may be equally applicable to other machines and machinery.

However, when the maneuvers that must be performed by the machine are prolonged and magnified in size the use of an ordinary control "stick" becomes awkward and cumbersome. This is because the pilot or operator finds it difficult to accurately control the lever. The operator is always acting in opposition to a biasing arrangement which tends to center the stick. This has a tendency to tire and quickly fatigue the operator which often results in overcontrol and in unnecessary and inaccurate control of the output machine.

Accordingly, the desideratum of the present invention is to provide a simple and compact motion controlling apparatus which is capable of being operated by the finger of the hand resting comfortably on an adjacent surface and which includes an operating member having universal movement wherein such universal movement is converted into movement of output members located in different planes.

Another object of the present invention is to provide an apparatus for converting a resultant movement of an input operator into component movements of output operators which requires a minimum number of operating elements and which is economical to manufacture and easy to maintain.

Another object and feature of the present invention resides in the novel details of construction which provides a motion converting apparatus of the type described which utilizes a unique means for mounting an input member for universal movement to provide a smooth and continuously operable device which requires a minimum amount of force for its operation.

Other and further objects of this invention reside in the structures and arrangements hereinafter more fully described with reference to the accompanying drawings in which.

The motion converting apparatus of the present invention is designated generally by the numeral 10 in the figures and includes a frame F which universally mounts a sphere 32. Motion transmitting means 56 and 58 resolve the universal movement of the sphere 32 into component movements of respective output shafts 100 and 148 to provide a simple and compact apparatus which may be utilized advantageously as a steering control in aircraft and the like.

Figure 3:
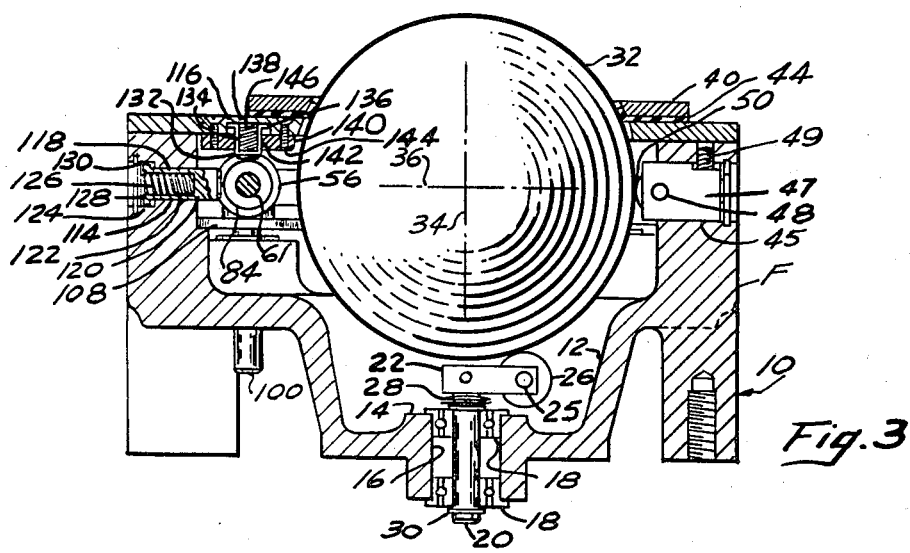
FIG. 3 is a sectional view taken along the line 3—3 of FIG. 1.

More particularly defined in the frame F is a recess 12 having a bottom wall 14 (FIG. 3). Provided in the bottom wall 14 is a central through bore 16 which receives ball bearing supports 18 at each end of the bore. Rotatably received in the supports 18 is a steel shaft 20 which mounts a transversely extending arm 22 at its inner end. The arm 22 is bifurcated at 24 (FIG. 1) and receives a pin 25 between the bifurcated ends which mounts a roller 26. As shown in FIG. 3, the roller 26 is laterally off-set with respect to the axis of the shaft 20.

Received between the inner bearing support 18 and the arm 22 is a spring 28 which biases the shaft 20 inwardly. Received in an appropriate groove on the outer end of the shaft 20 is a C-ring 30 which is adapted to engage the outer bearing support 18 to limit the inward travel of the shaft 20.

Figure 1:
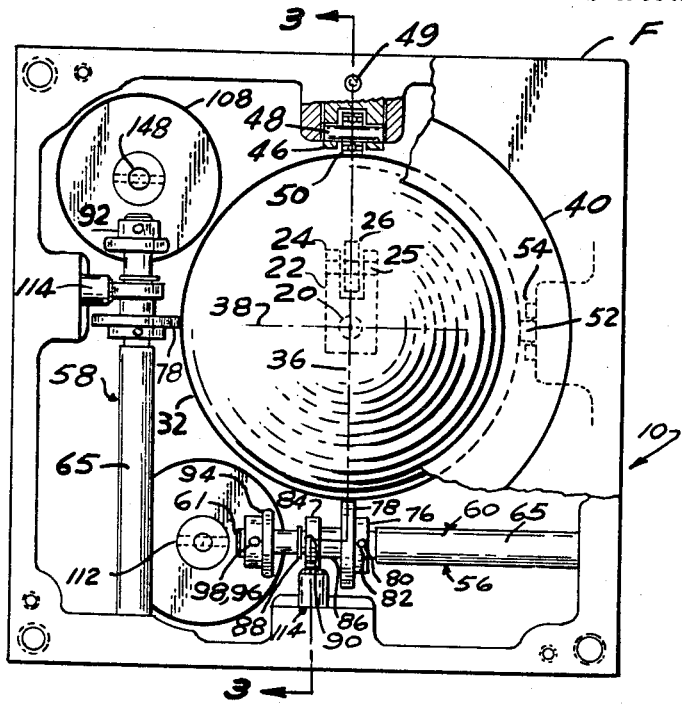
FIG. 1 is a top plan view of a motion converting apparatus constructed in accordance with the present invention, with parts broken away and other parts shown in cross-section.

Partially received within the recess 12 is a sphere 32 having a vertical central axis 34 and respective horizontal central axes 36 and 38 (FIG. 1). The sphere 32 normally abuts the roller 26 with the upper portion of the sphere projecting substantially beyond the open end of the recess 12. A retaining ring 40 surrounds the upper portion of the sphere 32 and it is connected to the frame F by a plurality of circumferentially spaced bolts 42 and nuts 43 to retain the sphere 32 in the recess 12. A seal 44, which may be made of Teflon or a like material, is compressed between the retaining ring 40 and the frame F and extends between the sphere 32 and the ring 40 to prevent foreign matter from entering the recess 12 and to provide a substantially frictionless bearing surface so that the sphere 32 is easily rotatable in the recess 12. The sphere 32 is positioned so that the vertical central axis 34 is aligned with the axis of the shaft 20 for reasons which will become apparent from the description hereinbelow.

The roller 26 and its associated elements provide a universal mount for the sphere 32 in the frame F. That is, when the sphere 32 is rotated in either a clockwise or a counterclockwise direction as taken in FIG. 3, the roller 26 will rotate about its axis. On the other hand, when the sphere 32 is rotated in either a clockwise or a counterclockwise direction, as taken in FIG. 1, the arm 22 will rotate about the axis of the shaft 20 since the roller 26 is offset with respect to the central axis 34 of the sphere 32. Additionally, movement of the sphere 32 in any intermediate direction will be accompanied by both a rotation of the roller 26 about its own axis and the arm 22 about the axis of the shaft 20 until the axis of the roller 26 is perpendicular to the direction of motion of the sphere. Hence, the sphere 32 is able to move in any direction with substantially no retarding frictional force operating on the sphere.

Provided in the frame F is an aperture 45 (FIG. 3) which slidably receives a block 47 therein. The block 47 terminates in opposed ears 46 which receive a pin 48 therebetween. Rotatably mounted on the shaft 48 is a roller 50. The block 47 is adapted to be moved inwardly until the roller 50 engages the sphere 32 at the end of the central axis 36 of the sphere. A set-screw 49 is threadedly received in the frame F and it is adapted to abut the block 47 in tight frictional engagement therewith to maintain the block in position.

A roller 52 is similarly mounted on the frame F between opposed ears 54 of a block which is slidably received in the frame F and it is adapted to abut the block 47 in tight frictional engagement therewith to maintain the block in position.

A roller 52 is similarly mounted on the frame F between opposed ears 54 of a block which is slidably received in an appropriate aperture (not shown) in the frame. The roller 52 engages the sphere 32 at a point on the central axis 38 of the sphere. Accordingly, the rollers 50 and 52 engage the sphere 32 in mutually perpendicular planes to centrally locate the sphere 32 in the recess 12.

Two motion transmitting means, designated generally by the numerals 56 and 58 in FIG. 1, engage the sphere 32 along two mutually perpendicular axes and are operable to convert the resultant universal movement of the sphere 32 into component movements of the respective motion transmitting means 56 and 58.

Figure 2:
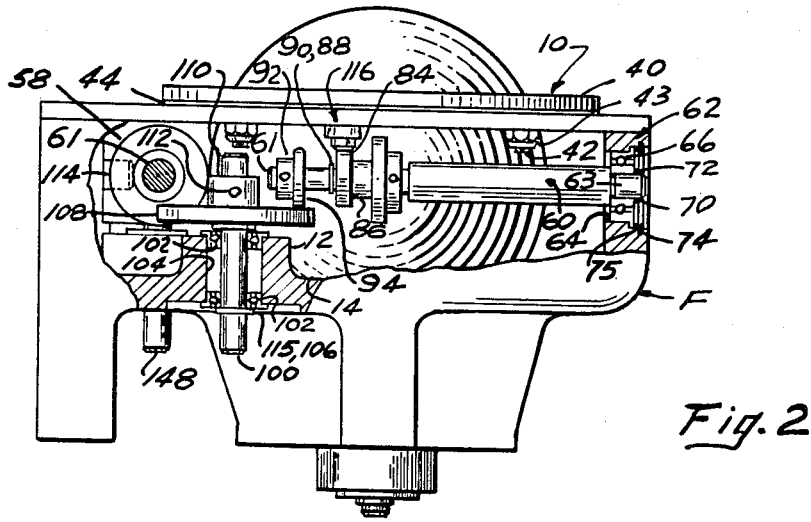
FIG. 2 is a side elevational view of the apparatus shown in FIG. 1, with parts broken away, partially in cross-section.

More particularly, the motion transmitting means 56 includes a shaft 60, having a central portion 65 and reduced diameter front and rear end portions 61 and 63. The shaft 60 is rotatably and angularly mounted on the frame F by a support designated generally by the numeral 62 in FIG. 2. Specifically, the frame F is provided with a transverse through bore 64. Received within the through bore is a pivot bearing 66 that rotatably receives the reduced diameter end portion 63 of the shaft 60 therein. Received in an appropriate groove in the end portion 63 is a C-ring 70 which limits movement of the shaft 60 toward the left, as taken in FIG. 2. An antifriction bearing 72 is received between the C-ring 70 and the bearing 66 thereby to eliminate frictional forces which may be generated if the C-ring 70 abuts the bearing 66 during rotation of the shaft 60. Additionally, a C-ring 74 is received in a groove in an enlarged diameter portion of the bore 64 to prevent outward movement of the bearing 66. Inward movement of the bearing 66 is prevented by a peripheral flange 75 which engages a shoulder which is defined between the enlarged diameter portion and the smaller diameter portion of the bore 64.

The bearing 66 is adapted to rotatably mount the shaft 60 on the frame F and to provide a substantially frictionless support. Additionally, the bearing 66 is adapted to have limited angular movement in both the X (or horizontal) and Y (or vertical) planes so that the shaft 60 is vertically and horizontally movable on the frame F in addition to being rotatably supported thereon. That is, the inner and outer races of the bearing support 66 are deliberately constructed to have angular movement with respect to each other. However, this relative movement is selected to be within predetermined limits so that the motion transmitting means 56 may be moved into intimate contact with the sphere 32 and an approprite take-off assembly, as noted in detail below.

Received on the front portion 61 of the shaft is a circular member 76 having a radially extending peripheral flange 78 that is adapted to frictionally engage the sphere 32. A set screw 80 extends through a threaded bore 82 in the member 76 and is adapted to abut the surface of the shaft portion 61 to maintain the member 76 in position. The member 76 is located so that the peripheral flange 78 is centrally located with respect to the horizontal central axis 36 of the sphere 32.

A ball bearing or collar 84 rotatably receives the reduced diameter portion 61 of the shaft therein. That is, the collar 84 comprises an outer race and an inner race having bearings therebetween so that the inner race is rotatable with respect to the outer race. The inner race is fixedly mounted on the shaft portion 61 so that the shaft 60 is therefore rotatable with respect to the outer race of the collar 84. A spacing member 86 maintains the collar 84 in spaced relation to the peripheral flange 78 of the member 76. A C-ring 88 is received in an appropriate groove in the reduced diameter portion 61 of the shaft and is adapted to prevent axial motion of the collar 84. A spacer 90 is received between the C-ring 88 and the collar 84.

Received on the end of the portion 61 of the shaft is a member 92 having a radially extending peripheral flange 94. A set screw 96 is threadedly received in a threaded bore 98 in a member 92 and is adapted to engage the shaft portion 61 in a tight frictional engagement to fixedly mount the member 92 on the shaft portion 61. The member 92 is adapted to transmit the rotational movement of the motion transmitting means 56 into a rotational movement of an output shaft 100.

More particularly, the output shaft 100 is rotatably received in opposed ball bearing supports 102 which, in turn, are fixedly received at the opposite ends of a through bore 104 in the frame F. A C-ring 106 is received in an appropriate groove in the shaft 100 adjacent to the bottom end thereof and is adapted to abut the lower support 102 to prevent upward movement of the shaft 100. Received on the shaft 100 adjacent to the top end thereof is a disc 108 that is provided with a hub 110. A set screw 112 is threadedly received in the hub 110 and abuts the shaft 100 to non-rotatably affix the disc 108 thereon. The disc 108 is adapted to engage the front surface of the upper support 102 to prevent downward movement of the shaft 100. Spacers 115 are received between the disc 108, the C-ring 106 and the respective supports 102 to eliminate frictional forces. The disc 108 is adapted to frictionally engage the flange 94 of the member 92 so that the rotation of the motion transmitting means 56 causes a corresponding rotation of the output shaft 100.

As noted hereinabove, the pivot bearing 66 mounts the shaft 65 for limited angular movement. Accordingly, biasing means 114 and 116 are provided to respectively bias the flange 78 into engagement with the sphere 32 and the member 92 into frictional engagement with the disc 108. The biasing arrangement 114 is illustrated in FIG. 3 and includes a through bore 118 in the frame F having an inner portion of reduced diameter.

Slidably received in the bore 118 is a piston 120 having an open-ended blind passage 122 therein. Provided at the rear of the piston 120 is a radially extending peripheral flange 124 that is adapted to engage the shoulder defined between the enlarged and small diameter portions of the bore 118 to limit forward movement of the piston. A spring 126 is received in the passage 122 and extends between the blind end of the passage and a plate 128 which is received in the enlarged portion of the bore 118. A C-ring 130 is received in an appropriate groove in the enlarged portion of the bore 118 to provide a stop for the plate 128. Accordingly, the spring 126 forces the piston 120 inwardly toward the sphere 32.

The end of the piston 120 is adapted to engage the collar 84 on the shaft 60 thereby to bias the peripheral flange 78 into intimate contact with the sphere 32. If a force is exerted on the shaft 60 which would cause the shaft to move in opposition to the bias produced by the spring 126, the piston would simply move rearwardly until it contacted the plate 128. This aforementioned distance of travel of the piston 120 is preselected to be within the limit of travel of the pivot bearing 66 thereby to prevent damage to the pivot bearing.

The biasing arrangement 116 similarly includes a piston 132 which is provided with an open-ended blind passage 134 and a radially extending peripheral flange 136 adjacent the open end of the passage 134. The piston 132 is received in a recess 138 in the frame F which overlies the collar 84 of the motion transmitting means 56. A plate 140 having a through bore 142 therein which slidably receives the piston 132 is connected to the frame F by screws 144. The bore 142 is of smaller diameter than the flange 136 and, accordingly, limits the downward movement of the piston 132. That is, the flange 136 is adapted to engage the surface of the plate 140 to prevent its further downward movement.

A spring 146 extends between the bottom of the recess 138 and the end of the passage 134 and is operable to bias the piston downward into contact with the collar 84. Accordingly, the biasing arrangement 116 biases the flange 94 of the member 92 into tight frictional engagement with the disc 108. More particularly, as noted above, the pivot bearing 66 allows movement of the shaft 60 in a vertical plane and, accordingly, the biasing arrangement 116 moves the member 92 into the aforementioned tight frictional engagement within the limits of movement afforded by the bearing support 66.

The motion transmitting means 58 is identical in construction to the motion transmitting means 56 and likewise terminates in a connecting device which includes a member 92 that frictionally engages a disc 108 which, in turn, is fixed on an output shaft 148 which is mounted on the frame F in a manner similar to the mounting of the output shaft 100. However, the peripheral flange 78 associated with the motion transmitting means 58 engages the sphere 32 along the central axis 38. In other words, the motion transmitting means 56 and 58 are oriented in mutually perpendicular planes. Thus, the universal movement of the sphere 32 will be converted into relative rotations of the motion transmitting means 56 and 58. Since the respective motion transmitting means are oriented in mutually perpendicular planes, the rotation of each of the output shafts 100 and 148 will represent corresponding movements in X and Y planes. Hence, the universal movement of the sphere 32 is thereby converted into respective movements along axes which are perpendicular to each other.

It is also to be noted that the respective rollers 50 and 52 engage the sphere 32 at points which are opposite the respective flanges 78. Accordingly, the rollers 50 and 52 which are fixedly mounted on the frame F by means of their associated set-screws, oppose the transverse movement of the sphere along the axes 36 and 38 in a direction toward the respective rollers. Thus, these rollers also act as stops to limit the inward movement of the motion transmitting means 56 and 58.

Accordingly, a motion converting apparatus has been described for converting the universal movement of an input operator into component movements of respective output members to resolve the input motions, which is simple in construction and operation.

It is to be noted that two biasing arrangements, 114 and 116 have been utilized to bias the motion transmitting means 56 and 58 inward toward the sphere 32 and downward into contact with the disc 108. Accordingly, the resultant force of these two biasing arrangements is in a direction intermediate the inward and downward directions produced by the biasing arrangements 114 and 116. Thus, these two arrangements may be replaced by a single biasing means which similarly produces a resultant force whose line of action operates along the line of action of the resultant produced by the two forces generated by the biasing arrangements 114 and 116.

Figure 4:
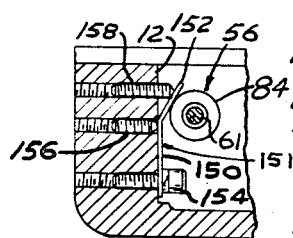
FIG. 4 is a detail cross-sectional view of a modified embodiment of a biasing arrangement which may be used in the apparatus shown in FIG. 1.

An arrangement such as that described in the foregoing paragraph is illustrated in FIG. 4 and includes a resilient strip 151 having a straight portion 150 and an upper portion 152 that is inclined inwardly and upwardly toward the motion transmitting means 56. The strip 151 is affixed to the side wall of the recess 12 by a bolt 154 that extends through the straight portion 150 and is threadedly received in an appropriate aperture in the frame F. The inclined portion 152 of the strip or member 151 is adapted to engage the collar 84 on the portion 61 of the shaft 60. A set screw 156 is threadedly received in the frame F and abuts the straight portion 150 of the resilient member 151. The screw 156 is adapted to selectively bias the strip inwardly until the portion 152 contacts the collar 84 to produce a preselected force on the collar. The force acts along a line which is perpendicular to the point of contact between the portion 152 and the collar 84. Accordingly, the force will be directed along a direction which is the same as the direction of the resultant produced by the two biasing arrangements 114 and 116.

If any outward forces are applied to the shaft portion 61 due to sudden accelerations or decelerations, for example, the shaft 60 is apt to exert a force against the member 151 and, accordingly, the movement of the shaft may exceed the limit of movement allowed by the bearing support 66 thereby ruining the support. This action may also permanently deform the portion 152 of the resilient member 151. In order to prevent this occurrence, a set screw 158 is threadedly received in the frame F and is adapted to be positioned in spaced relation to the portion 152 of the strip 151 by a preselected distance. This distance is selected to be within the limit of motion dictated by the bearing support 66.

Accordingly, the arrangement shown in FIG. 4 may be advantageously utilized instead of the biasing arrangements 114 and 116 and still provide protection against excessive movement of the shaft 60 beyond the limits dictated by the bearing support 66.

Figure 5:
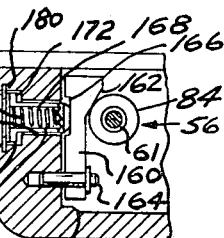
FIG. 5 is a detail cross-sectional view of another modified embodiment of a biasing arrangement which may be used in the apparatus illustrated in FIGS. 1–3.

FIG. 5 illustrates another modified embodiment of a biasing arrangement which may be utilized in place of the biasing arrangements 114 and 116. Accordingly, the biasing arrangement illustrated in FIG. 5 includes a member 160 having an enlarged head portion which includes an inclined cam surface 162 that is adapted to engage the collar 84 on the motion transmitting means 56. Similarly to the arrangement shown in FIG. 4, the force produced by the member 160 will be perpendicular to the point of contact between the cam surface 162 and the collar 84. A pin 164 is slidably received through the bottom of the member 160 and is similarly slidably received in an appropriate bore in the frame F to orient the member 160 so that the cam surface 162 abuts the collar 84.

Provided on the rear surface of the member 160 is a recess 166. Received within the recess 166 is a piston 168 that is slidably received in a bore 170 in the frame F. The bore 170 includes an enlarged diameter rear portion and a smaller diameter front portion that define a shoulder 172 therebetween. The piston 168 is provided with a radially extending peripheral flange 174 that is adapted to engage the shoulder 172 to limit the forward movement of the piston 168 toward the motion transmitting means 56. Provided in the piston 168 is an open-ended blind passage 176 that receives the spring 178 therein. The spring 178 extends between the end wall of the passage 176 and a plate 180 which is located beyond the piston 168 in the bore 170. Rearward movement of the plate 180 is arrested by the C-ring 182 that is received in an appropriate groove in the bore 170.

The spring 178 is operable to bias the piston 168 forwardly to exert a force against the member 160. The cam surface of the member 160 engages the collar 84 to produce a force as noted above, which is essentially in the same direction as the resultant force produced by the biasing arrangements 114 and 116. Additionally, the piston 168 serves to bias the member 160 into a position wherein the member 160 is in spaced relation to the side wall of the recess 12 in the frame F. The member 160 is sized and positioned so that it will engage the side wall of the recess 12 when a force is applied to the motion transmitting means 56 in a direction opposite to the force produced by the spring 178. This spacing is chosen so that the distance the shaft moves through to cause the member 160 to engage the side wall of the recess 12 will be within the limits of movement permitted by the bearing support 66. Hence, damage to the pivot bearing support 66 thereby is prevented.

Figure 6:
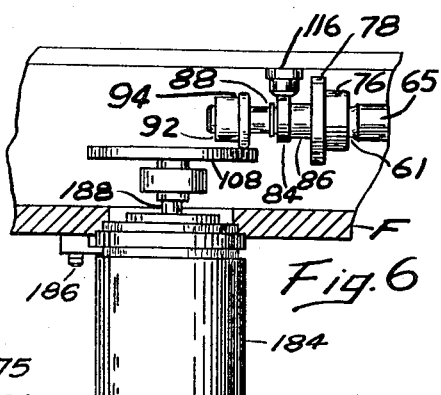
FIG. 6 is a detail view illustrating a direct drive between the apparatus of the present invention and a load device.

While one form of take-off mechanism for connecting the respective motion transmitting means 56 and 58 to respective output shafts 100 and 148 has been shown and described hereinabove, it is to be noted that other take-off arrangements may be provided. For example, as shown in FIG. 6, the member 92 and the disc 108 may be utilized to drive the input shaft of a component 184 directly.

More specifically, the component 184, which may be a servomechanism or the like, is connected to the frame F by bolts 186, one of which is shown in the figure. An input shaft 188 of the component 184 is connected directly to the disc 108 in a manner similar to the connection between the disc 108 and the output shaft 100. Thus, rotation of the motion transmitting means 56 by the sphere 32 will result in a corresponding change in the output of the component 184.

Figure 7:
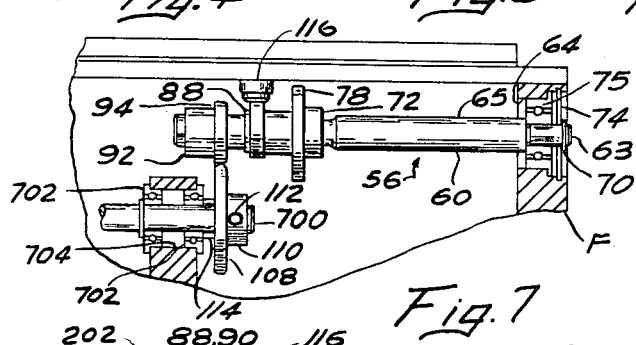
FIG. 7 is a detail view of a modified embodiment of a take-off arrangement for the apparatus of the present invention.

Another modified form of take-off arrangement is illustrated in FIG. 7 wherein the axis of a bore 704 is parallel to the axis of the shaft 60. Accordingly, the flange 94 on the member 92 engages the peripheral edge of the disc 108 to rotate an output shaft 700. Similar to the arrangement illustrated in FIG. 2, the output shaft 700 illustrated in FIG. 7 is supported between the bearings 702 which are also received in the horizontally extending bore 704.

Figure 8:
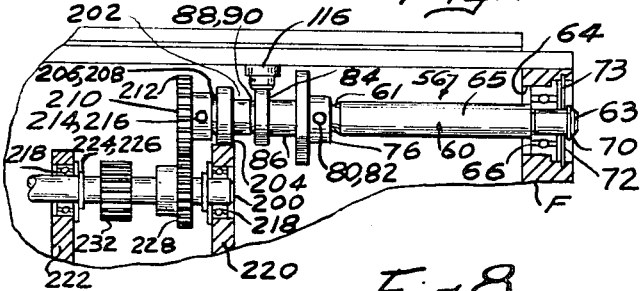
FIG. 8 illustrates a further modified embodiment of a take-off arrangement for the apparatus of the present invention.

As a feature of the present invention, a gear drive rather than a frictional drive may be provided between the motion transmitting means 56 and an output shaft 200. Thus, as shown in FIG. 8, a spacing member 202 is received on the shaft portion 61 following the C-ring 88. A ball-bearing support or collar 204 is rotatably received on the shaft portion 61 in engagement with the spacing member 202. A C-ring 206 is received in an appropriate groove in the shaft portion 61 to prevent axial movement of the collar 204 thereon. An anti-friction bearing 208 is received between the collar 204 and the C-ring 206 to substantially eliminate frictional forces between the C-ring 206 and the collar.

Received on the end of the shaft portion 61 is a gear 210 having radially extending teeth 212 about its peripheral edge. The gear 210 is fixed on the shaft portion 61 by means of a set-screw 214 which is received in a threaded bore 216 in the gear 210 and which is adapted to be screwed into a butting relation with the shaft portion 61.

A horizontal shaft 200 is rotatably supported in bearing supports 218 which are received in aligned bores in respective members 220 and 222 defined in the frame F. C-rings 224 are received in appropriate grooves in the shaft 200 to prevent axial movement of the shaft. A spacer 226 is provided between the left-hand C-ring 224 and the bearing 218. Fixedly received on the shaft 200 is a gear which is in meshing engagement with the gear 210. The gear 228 is fixed on the shaft 200 by means of a radially extending set screw (not shown) which is received in an appropriate threaded aperture in the gear 228. A gear 232, which may form an integral part of the shaft 200, is adapted to be connected to another gear (not shown) to drive the input shaft of an associated component.

Since the pivot bearing 66 provides for the vertical movement of the shaft 60, the collar or bearing support 204 is positioned to engage the member 220 of the frame F to limit the downward movement of the shaft 60. Accordingly, the member 220 and the bearing support or collar 204 are dimensioned so that the gears 210 and 228 will not jam and the shaft 60 will be freely rotatable. Accordingly, the aforedescribed arrangement eliminates any possible slippage which may occur between the motion transmitting means 56 and an output shaft due to a frictional connection therebetween.

While preferred embodiments of the present invention have been shown and described herein, it will be obvious that numerous omissions, changes and additions may be made in such embodiments without departing from the spirit and scope of the present invention.

I claim:

1. A motion converting device comprising, in combination:
   a frame;
   a sphere;
   mounting means for mounting said sphere on said frame for universal movement with respect thereto;
   a first and a second output shaft rotatably mounted on said frame;
   a first and a second motion transmitting means for converting the motion of said sphere into respective rotatable motions of said first and second output shafts;
   respective support means receiving one of the ends of said first and second motion transmitting means therein to mount the same to said frame and to enable said first and second motion transmitting means to transmit the universal movement of said sphere to the first and second output shafts and for providing limited angular movement of said motion transmitting means with respect to said sphere;
   connecting means at the other ends of said first and second motion transmitting means for connecting said first and second motion transmitting means in driving relation with the respective first and second output shafts;
   said first and second motion transmitting means including drive means intermediate their ends responsive to the movement of said sphere for rotating the associated motion transmitting means,
   and biasing means on said frame for angularly biasing the respective drive means into engagement with said sphere.

2. A motion converting device as in claim 1, wherein said respective support means orient said first and second motion transmitting means in mutually perpendicular planes.

3. A motion converting device according to claim 1, in which said mounting means includes a stub shaft rotatably connected to said frame with the axis of said stub shaft in alignment with a central axis of said sphere, and roller means connected to said stub shaft and being offset with respect to the central axis of said sphere and engaging said sphere to mount said sphere for universal movement.

4. A motion converting device as in claim 3, wherein said mounting means further includes a pair of rollers, a different one of said pair of rollers being positioned opposite each of said drive means on said first and second motion transmitting means and in engagement with said sphere to rotatably support said sphere.

5. A motion converting device in accordance with claim 1, in which said connecting means includes respective discs fixedly mounted on said first and second output shafts, and means on said first and second motion transmitting means frictionally engaging said respective discs for converting the motion of said first and second motion transmitting means into rotations of said first and second output shafts.

6. A motion converting device in accordance with claim 1, wherein said connecting means includes a first and a second gear respectively connected to said first and second output shafts, and a third and a fourth gear respectively connected to said first and second motion transmitting means, said first and third and said second and fourth gears being in meshing engagement, and spacing means on said first and second motion transmitting means for maintaining the first and second motion transmitting means spaced from the respective first and second output shafts by a predetermined distance.

7. Motion resolving apparatus comprising
  a frame;
  a sphere;
  mounting means for mounting said sphere on said frame for universal movement with respect thereto;
  first and second output means rotatably mounted on said frame;
  first and second motion transmitting shafts for converting the motion of said sphere into respective rotatable motions of said first and second output means;
  respective rollable bearing supports for mounting said first and second motion transmitting shafts on said frame for rotatable and limited angular movement with respect to said sphere;
  biasing means for angularly biasing said first and second motion transmitting shafts into engagement with said sphere;
  and connecting means for connecting a different one of said first and second motion transmitting shafts in driving relation with a respective one of said first and second output means.

8. Motion transmitting apparatus as in claim 7, wherein said biasing means includes respective collars rotatably receiving said first and second motion transmitting shafts therethrough, pistons mounted on said frame and adapted to bear against said collars, and spring means for urging said pistons toward said sphere and into engagement with said collars.

9. A motion converting device according to claim 7, in which said mounting means includes a stub shaft rotatably connected to said frame with the axis of said stub shaft in alignment with a central axis of said sphere, and roller means connected to said stub shaft and being offset with respect to the central axis of said sphere and engaging said sphere to mount said sphere for universal movement.

10. A motion converting device as in claim 9, wherein said mounting means further includes a pair of rollers, a different one of said pair of rollers being positioned opposite said first and second motion transmitting shafts and in engagement with said sphere to rotatably support said sphere.

11. Motion transmitting apparatus as in claim 7, in which said biasing means includes respective collars rotatably receiving said first and second motion transmitting shafts, therein, resilient members connected to said frame and adapted to engage said collars to urge the respective first and second motion transmitting shafts into engagement with said sphere.

12. Motion transmitting apparatus as in claim 11, and means for selectively applying pressure to said resilient members to bias said first and second motion transmitting shafts into engagement with said sphere whereby said first and second motion transmitting shafts exert a predetermined force on said sphere.

13. Motion transmitting apparatus according to claim 12, and stop means spaced from said resilient members and adapted to engage said resilient members to limit angular movement of said first and second motion transmitting shafts away from said sphere.

14. A motion resolving mechanism including
  a frame,
  a sphere,
  mounting means for mounting said sphere on said frame for universal movement with respect thereto,
  a plurality of output shafts movably mounted on said frame,
  a motion transmitting means for each of said plurality of output shafts for converting the motion of said sphere into respective rotatable motions of said plurality of output shafts,
  a support means for each of said motion transmitting means for mounting a respective motion transmitting means on said frame for rotatable and limited angular movement with respect thereto,
  connecting means on each of said motion transmitting means for connecting different ones of said motion transmitting means in driving relation with respective ones of said plurality of output shafts,
  a biasing means for each of said motion transmitting means for biasing the associated motion transmitting means into engagement with said sphere,
  and stop means in spaced relation to each of said motion transmitting means for limiting the angular motion of each of said motion transmitting means in a direction away from said sphere.

15. A motion converting device according to claim 14, in which said mounting means includes a stub shaft rotatably connected to said frame with the axis of said stub shaft in alignment with a central axis of said sphere, collar means connected to said stub shaft and being offset with respect to the central axis of said sphere and engaging said sphere to mount said sphere for universal movement, a retaining ring for mounting said sphere on said frame, and anti-friction means between said sphere and said retaining ring for reducing frictional forces between said ring and said sphere.

16. A motion converting device as in claim 15, wherein said mounting means further includes a plurality of rollers, a different one of said plurality of rollers being positioned opposite each of said motion transmitting means and in engagement with said sphere to rotatably support said sphere.

17. A motion transmitting apparatus as in claim 14, in which said biasing means includes respective collars rotatably receiving said motion transmitting means therein, resilient members connected to said frame and adapted to engage said collars to urge the respective motion transmitting means into engagement with said sphere, and means for selectively applying pressure to said resilient members to bias said respective motion transmitting means into engagement with said sphere whereby said motion transmitting means exert a predetermined force on said sphere.

References Cited
UNITED STATES PATENTS

| | | | |
|---|---|---|---|
| 2,586,421 | 2/1952 | Evers | 74—198 |
| 2,869,429 | 1/1959 | Wetzel | 90—13.5 |
| 3,013,441 | 12/1961 | Alexander | 74—198 |

FRED C. MATTERN, JR., *Primary Examiner.*

B. T. CALLAHAN, *Assistant Examiner.*